United States Patent
Greenstreet et al.

(10) Patent No.: US 7,333,527 B2
(45) Date of Patent: Feb. 19, 2008

(54) EMI REDUCTION USING TUNABLE DELAY LINES

(75) Inventors: Mark R. Greenstreet, Vancouver (CA); Robert J. Bosnyak, San Jose, CA (US); Stuart A. Ridgway, Metuchen, NJ (US)

(73) Assignee: Sun Microsystems, Inc., Santa Clara, CA (US)

( * ) Notice: Subject to any disclaimer, the term of this patent is extended or adjusted under 35 U.S.C. 154(b) by 679 days.

(21) Appl. No.: 10/306,785

(22) Filed: Nov. 27, 2002

(65) Prior Publication Data

US 2003/0169838 A1    Sep. 11, 2003

Related U.S. Application Data

(60) Provisional application No. 60/333,706, filed on Nov. 27, 2001.

(51) Int. Cl.
   *H04B 1/00*   (2006.01)
   *H03D 3/24*   (2006.01)
   *H03L 7/06*   (2006.01)
   *H03H 11/26*  (2006.01)

(52) U.S. Cl. .................. 375/130; 375/376; 327/156; 327/158; 327/261; 327/269; 327/551

(58) Field of Classification Search ........ 375/373–376, 375/327, 130, 354, 133, 141, 146, 147, 371; 331/10, 18–19, 23, 25; 327/105, 156–157, 327/159, 257–258, 269, 298–299, 231, 234, 327/291, 292, 293, 294; 713/500, 501
See application file for complete search history.

(56) References Cited

U.S. PATENT DOCUMENTS

| | | | | |
|---|---|---|---|---|
| 5,550,514 A * | 8/1996 | Liedberg | .................... | 331/1 A |
| 5,682,114 A * | 10/1997 | Ohta | ........................ | 327/276 |
| 5,719,515 A * | 2/1998 | Danger | ..................... | 327/270 |
| 5,929,683 A * | 7/1999 | Menkhoff | .................. | 327/292 |
| 6,014,063 A * | 1/2000 | Liu et al. | ..................... | 331/78 |
| 6,092,030 A * | 7/2000 | Lepejian et al. | ............. | 702/79 |
| 6,127,858 A * | 10/2000 | Stinson et al. | ................ | 327/99 |
| 6,144,242 A * | 11/2000 | Jeong et al. | ................. | 327/269 |
| 6,392,461 B2 * | 5/2002 | Nunokawa et al. | ........ | 327/277 |
| 6,393,078 B1 * | 5/2002 | Sattler | ....................... | 375/346 |
| 6,486,716 B1 * | 11/2002 | Minami et al. | ............. | 327/152 |
| 6,518,813 B1 * | 2/2003 | Usui | ........................ | 327/291 |
| 6,600,771 B1 * | 7/2003 | Moon et al. | ................ | 375/130 |
| 6,643,317 B1 * | 11/2003 | Blumer | ...................... | 375/130 |
| 6,737,904 B1 * | 5/2004 | Butaud et al. | ............. | 327/298 |
| 6,738,919 B2 * | 5/2004 | Williams et al. | ........... | 713/401 |
| 7,010,014 B1 * | 3/2006 | Percey et al. | ............... | 375/130 |
| 2002/0143717 A1 * | 10/2002 | Landt | ......................... | 706/12 |

* cited by examiner

*Primary Examiner*—Mohammed Ghayour
*Assistant Examiner*—Sophia Vlahos
(74) *Attorney, Agent, or Firm*—Brooks Kushman P.C.

(57) ABSTRACT

The clock signal is the dominant source of electromagnetic interference (EMI) for many digital electronic devices. EMI generated by these electronic devices must be suppressed to avoid interference with other electronic devices and to satisfy FCC regulations. The present invention seeks to reduce EMI emissions by phase-modulating the clock signal using tunable delay lines. Phase modulation causes a spreading of the energy spectrum of the clock signal thereby reducing EMI emissions. In addition, the present invention is capable of generating a wide energy spectrum in a short time interval. Furthermore, the present invention can be similarly applied to other signals which exhibit a periodic or timing nature due to a correlation with the clock signal.

28 Claims, 5 Drawing Sheets

Covering all possible phase shifts with three delay lines.

Delay increases by 0.18π for each clock event:
output_event_time(i) = logical_input_event_time(i) + (4.75 + 0.18 * i)π

| To generate output event i | logical input event time | delay requested | use input event | input event time | use delay line | with delay value | output event time |
|---|---|---|---|---|---|---|---|
| 0 | 0π | 4.75π | 1 | 2π | $D_2$ | 2.75π | 4.75π |
| 1 | 2π | 4.93π | 2 | 4π | $D_1$ | 2.93π | 6.93π |
| 2 | 4π | 5.11π | 4 | 8π | $D_0$ | 1.11π | 9.11π |
| 3 | 6π | 5.29π | 5 | 10π | $D_0$ | 1.29π | 11.29π |
| 4 | 8π | 5.47π | 6 | 12π | $D_1$ | 1.47π | 13.47π |
| 5 | 10π | 5.65π | 7 | 14π | $D_1$ | 1.65π | 15.65π |
| 6 | 12π | 5.83π | 8 | 16π | $D_1$ | 1.83π | 17.83π |
| 7 | 14π | 6.01π | 9 | 18π | $D_1$ | 2.01π | 20.01π |
| 8 | 16π | 6.19π | 10 | 20π | $D_2$ | 2.19π | 22.19π |
| 9 | 18π | 6.37π | 11 | 22π | $D_1$ | 2.37π | 24.37π |
| 10 | 20π | 6.55π | 12 | 24π | $D_2$ | 2.55π | 26.55π |
| 11 | 22π | 6.73π | 13 | 26π | $D_2$ | 2.73π | 28.73π |
| 12 | 24π | 6.91π | 14 | 28π | $D_2$ | 2.91π | 30.91π |
| 13 | 26π | 7.09π | 16 | 32π | $D_0$ | 1.09π | 33.09π |
| 14 | 28π | 7.27π | 17 | 34π | $D_0$ | 1.27π | 35.27π |
| 15 | 30π | 7.45π | 18 | 36π | $D_1$ | 1.45π | 37.45π |
| 16 | 32π | 7.63π | 19 | 38π | $D_1$ | 1.63π | 39.63π |

Delay increases by 0.18π for each clock event:
output_event_time(i) = logical_input_event_time(i) + (4.75 − 0.18 * i)π

| To generate output event i | logical input event time | delay requested | use input event | input event time | use delay line | with delay value | output event time |
|---|---|---|---|---|---|---|---|
| 0 | 0π | 4.75π | 1 | 2π | $D_2$ | 2.75π | 4.75π |
| 1 | 2π | 4.57π | 2 | 4π | $D_2$ | 2.57π | 6.57π |
| 2 | 4π | 4.39π | 3 | 6π | $D_2$ | 2.39π | 8.39π |
| 3 | 6π | 4.21π | 4 | 8π | $D_2$ | 2.21π | 10.21π |
| 4 | 8π | 4.03π | 5 | 10π | $D_1$ | 2.03π | 12.03π |
| 5 | 10π | 3.85π | 6 | 12π | $D_1$ | 1.85π | 13.85π |
| 6 | 12π | 3.67π | 7 | 14π | $D_1$ | 1.67π | 15.67π |
| 7 | 14π | 3.49π | 8 | 16π | $D_1$ | 1.49π | 17.49π |
| 8 | 16π | 3.31π | 9 | 18π | $D_0$ | 1.31π | 29.31π |
| 9 | 18π | 3.13π | 10 | 20π | $D_0$ | 1.13π | 21.13π |
| 10 | 20π | 2.95π | 10 | 20π | $D_3$ | 2.95π | 22.95π |
| 11 | 22π | 2.77π | 12 | 22π | $D_2$ | 2.73π | 24.73π |
| 12 | 24π | 2.59π | 13 | 24π | $D_2$ | 2.55π | 26.55π |
| 13 | 26π | 2.41π | 14 | 26π | $D_2$ | 2.37π | 28.37π |
| 14 | 28π | 2.23π | 15 | 28π | $D_2$ | 2.21π | 30.21π |
| 15 | 30π | 2.05π | 16 | 30π | $D_1$ | 2.01π | 32.01π |
| 16 | 32π | 1.83π | 17 | 32π | $D_1$ | 1.83π | 33.83π |
| ... | ... | ... | ... | ... | ... | ... | ... |
| 50 | 50π | −4.25π | 47 | 94π | $D_1$ | 1.75π | 75.75π |

Delay line settings for increasing and decreasing delays

FIGURE 6

A design with two identical delay lines

EMI REDUCTION USING TUNABLE DELAY LINES

CROSS REFERENCES TO RELATED APPLICATION

The present application claims the benefit of priority under 35 U.S.C. § 119 from U.S. Provisional Patent Application Serial No. 60/333,706, entitled "EMI REDUCTION USING TUNABLE DELAY LINES" filed on Nov. 27,2001, the disclosure of which is hereby incorporated by reference in its entirety for all purposes.

FIELD OF THE INVENTION

The present invention generally relates to the reduction of electromagnetic interference. More specifically, the present invention relates to the reduction of electromagnetic interference generated by the clock and other signals inside electronic devices such as computers and cellular telephones.

BACKGROUND OF THE INVENTION

The electromagnetic interference (EMI) generated by an electronic device must be suppressed to avoid interference with other electronic devices and to satisfy FCC regulations. For example, a number of computer workstations or servers contain conductive components in their cases or housings to create Faraday cages to limit the emissions of EMI. The incorporation of such components to provide shielding of EMI adds to the cost of manufacturing the workstations and servers.

The clock signal is the dominant source of EMI for many electronic devices. In addition, since the currents flowing through the power and data paths for an integrated circuit tend to be temporally correlated with the clock signal, other signals which bear a relationship with the clock signal can also be a source of EMI within an electronic device.

Most of the energy causing EMI is radiated via the power supply signals on the circuit board and in the IC package. Because the clock signal is generally periodic, much of this radiation is concentrated at the clock frequency and its harmonics. In other words, when the energy spectrum of the clock signal is shown graphically, there are distinctive peaks associated with certain frequencies.

One way to mitigate the effects of this radiation is to modulate the clock signal so that the energy is spread over a wider range of frequencies. This can reduce the severity of the interference caused by the electronic device as most radio communications devices operate with relatively narrow band signals. Accordingly, FCC (Federal Communications Commission) regulations for EMI specify a maximum intensity in any small band of the spectrum.

Since the clock signal is an important component of any computer, the opportunity to utilize spread spectrum clock generators has been exploited in some PC designs. Frequency modulation has been used to provide a spread energy spectrum. For example, NeoMagic Corporation sells a reference clock generator where the reference oscillator is frequency modulated by a triangular wave with a frequency near 100 KHz (see Dual-Loop Spread-Spectrum Clock Generator, Proceedings of the 1999 IEEE International Solid-State Circuits Conference, pp. 184-185, 459, February, 1999). Intel Corporation has committed to support this approach which means that it is guaranteed that Intel's on-chip phase-locked loops will operate properly when driven by such a frequency modulated source.

FIG. 1 shows a typical clock generator for a CPU. A reference oscillator 10 generates a stable clock signal which is multiplied in frequency by a phase-locked loop 12 on the CPU chip 14 to obtain the CPU clock. Typically, the frequency multiplication is in the range of two to six. The high frequency signal from the phase-locked loop 12 is then amplified by a clock buffer 16 and accordingly distributed to the logic circuitry 18 outside of the CPU 14.

However, the primary objectives of phase-locked loop (PLL) design are in opposition to the goals of frequency modulation. In particular, the on-chip PLL is generally designed to be as stable as possible to minimize clock jitter. Thus, it is desirable to use a low-pass filter in the PLL with the lowest cut-off frequency possible. On the other hand, for the frequency modulation technique to be effective, the cut-off frequency of the low-pass filter must be higher than the modulation frequency. In addition to compromising clock jitter, this trade-off limits the modulation frequency for the reference. When low modulation frequencies are used, the computer may still produce noxious EMI even if it technically satisfies the FCC requirements. For this reason, some computer manufacturers have expressed reluctance to utilize the frequency modulation technique to achieve a wide energy spectrum clock.

Frequency modulating an oscillator to generate a wider energy spectrum for a clock signal has a number of additional disadvantages. For example, frequency modulation affects the operation of the PLL 12. Hence, the stability of the PLL 12 is affected. Moreover, the energy spreading resulted from using frequency modulation generally takes relatively long periods of time to achieve. Therefore, it would be desirable to provide a more efficient apparatus and method to reduce electromagnetic interference generated by signals emanating from inside electronic devices.

SUMMARY OF THE INVENTION

A first embodiment according to the present invention includes an adjustable delay generator coupled between a PLL and a clock buffer. The function of the adjustable delay generator is to produce a delayed version of a clock signal using phase-modulation in accordance with a predetermined overall delay.

In another embodiment of the present invention, the adjustable delay generator further includes an adjustable delay pipeline and a delay controller. The delay controller receives the predetermined overall delay and adjusts the transmission delay (to effect phase-modulation) along the adjustable delay pipeline accordingly.

In a further embodiment of the present invention, the adjustable delay pipeline further comprises two separately adjustable delay lines and the adjustable delay generator also includes a delay multiplexer. The two adjustable delay lines separately accept the clock signal as their input. The output of the two adjustable delay lines are connected to the delay multiplexer. The delay controller separately controls the two adjustable delay lines as well as the delay multiplexer in accordance with the predetermined overall delay. The two adjustable delay lines, however, have the ability to each operate with their own delay as directed by the delay controller. The delay multiplexer selects either one of the two adjustable delay lines pursuant to a control scheme followed by the delay controller to drive its output to produce a delayed version of the clock signal.

The present invention provides a number advantages. For example, the present invention provides an apparatus and method to more efficiently reduce electromagnetic interference generated by signals inside electronic devices by using phase modulation. The use of phase modulation allows the energy of a clock signal to be spread over a wider range of frequencies in a relatively short time interval. The present invention assures a high degree of decorrelation over short time intervals. For instance, it will be shown below that by using the present invention, the peak power can be reduced by more than 20 dB for a 1 GHz clock for any sampling interval longer than 8 microseconds (the minimum time interval for 125 KHz resolution). For longer sampling intervals, proportionally greater reductions will be observed. Furthermore, the present invention does not affect the operation of reference oscillators or phase-locked-loop circuits which are commonly used for clock signal generation.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

BRIEF DESCRIPTION OF THE DRAWINGS

FIG. 6 is a table showing delay line settings for increasing and decreasing delays;

DESCRIPTION OF THE SPECIFIC EMBODIMENTS

Figure 1:
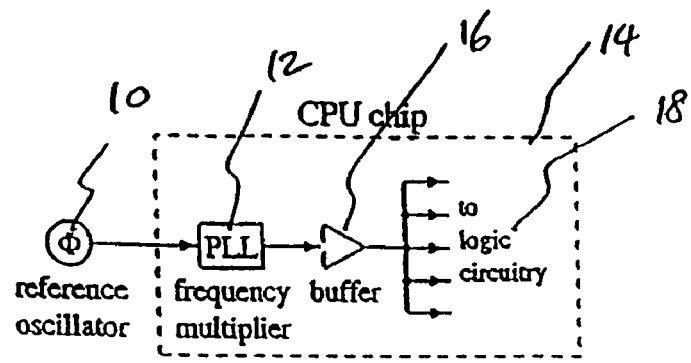
FIG. 1 is a simplified schematic block diagram showing a typical clock signal generator.
Figure 2:
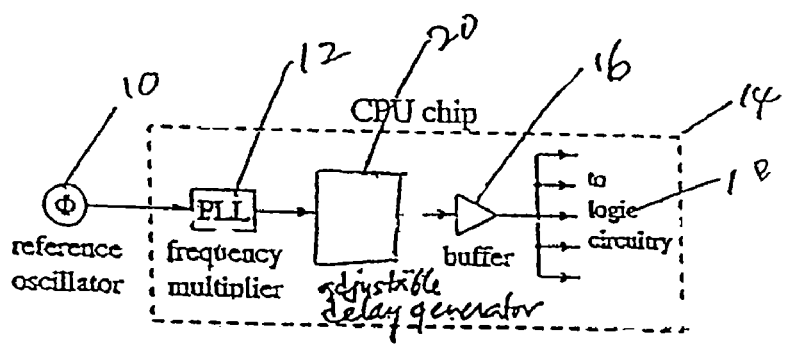
FIG. 2 is a simplified schematic block diagram showing a first embodiment of the present invention.

The present invention in the form of one or more exemplary embodiments will now be described. FIG. 2 shows the new spread-spectrum clock generation technique in accordance with the present invention. Compared with the traditional design shown in FIG. 1, a tunable or adjustable delay generator 20 is added between the phase-locked loop (PLL) 12 and the clock buffer 16. The adjustable delay generator 20 receives the clock signal produced by the PLL 12 and generates a delayed version of the clock signal using phase modulation.

Figure 3:
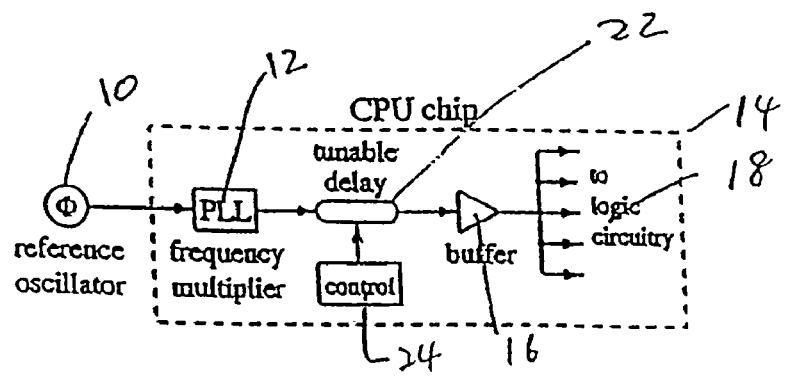
FIG. 3 is a simplified schematic block diagram showing a second embodiment of the present invention.

FIG. 3 shows another embodiment of the present invention illustrating one implementation of the adjustable delay generator 20. The adjustable delay generator 20 further includes an adjustable delay circuit or pipeline 22 and a delay controller 24. The delay value to be used by the adjustable delay pipeline 22 is set by the delay controller 24 via a control signal. For example, if the control signal for the adjustable delay pipeline is a digital value, the delay controller could output a pseudo-random sequence. Accordingly, a pseudo-random phase modulation of the clock signal is produced and applied to the clock buffer 16. It will be illustrated below that this technique can be used to spread the clock energy over a wide range of frequencies. Other digital control sequences or an analog control scheme could be employed in a similar manner.

Figure 4:
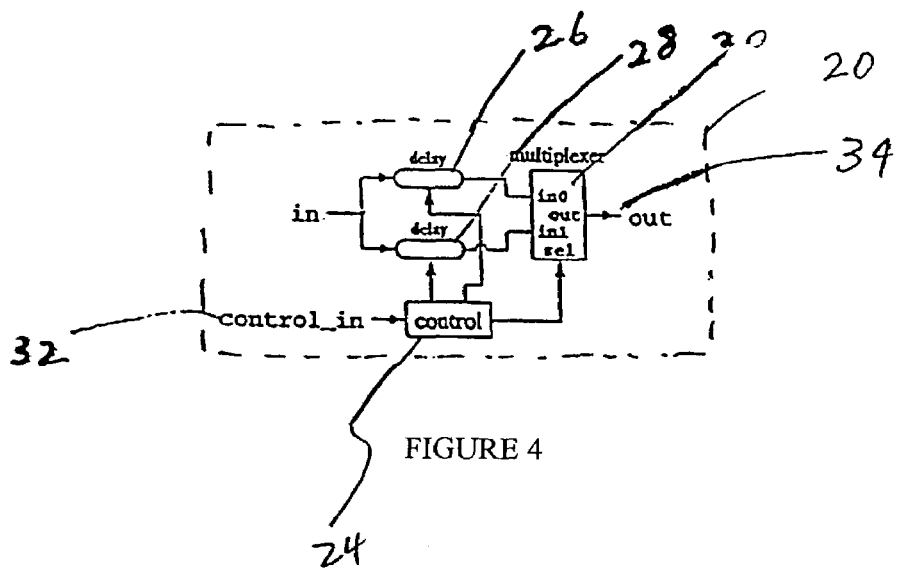
FIG. 4 is a simplified schematic block diagram showing a third embodiment of the present invention.

FIG. 4 shows one embodiment of the adjustable delay generator 20 in accordance with the present invention. The adjustable delay pipeline 22 further comprises two separately adjustable delay lines 26, 28 and the adjustable delay generator 20 also includes a delay multiplexer 30. The two adjustable delay lines 26, 28 separately accept the clock signal as their input. The output of the two adjustable delay lines 26, 28 are separately connected to the input of the delay multiplexer 30. The delay controller 24 separately controls the two adjustable delay lines 26, 28 as well as the delay multiplexer 30 in accordance with an overall delay as represented by the control_in signal 32. The overall delay can originate from either a random or predetermined source. For example, the value of the overall delay could be obtained from a pseudo-random number generator or a truly random source as such as thermal noise. The two adjustable delay lines 26, 28, however, may each operate with their own delay as directed by the delay controller 24. The delay multiplexer 30 selects either one of the two adjustable delay lines 26, 28 pursuant to a control scheme followed by the delay controller 24 to drive its output 34 to produce a delayed version of the clock signal.

Analysis

The control scheme presented here uses a periodic adjustable delay pipeline 22. As shown in FIG. 4, the periodic adjustable delay pipeline 22 includes the two adjustable delay lines 26, 28, each with a range of delay with the difference between the maximum and the minimum delay limit, $\delta_{max}$ and $\delta_{min}$, being at least one-half (½) period of the clock signal. Maintaining the difference between $\delta_{max}$ and $\delta_{min}$ to be at least one-half (½) period of the clock signal ensures an unlimited range of phase shifts. The foregoing can be understood by examining the following example. Assume there are two delay lines, with the first delay line having a delay range (in radians) of $\theta$ to $(\theta+\pi+\epsilon)$, $\epsilon>0$, and the second delay line having a delay range of $\theta+\pi$ to $(\theta+2\pi+\epsilon)$. Because phase shifts of $\theta$ and $\theta+2m\pi$, for any integer m, are indistinguishable, it is clear that these two delay lines can be used to achieve any phase shift and that the phase can be adjusted by any arbitrary amount.

More generally, consider a design with k delay lines, with corresponding indices $0..k-1$. Let $min_j$ and $max_j$ be the minimum delay and the maximum delay of delay line $j$, respectively. Using standard mathematical notation, if u=x mod y, then u is between 0 and y, and x−u is an integer multiple of y, and x div y=(x−(x mod y))/y. A delay of $\theta$ radians is feasible for delay line j if and only $$(\theta-min_j)mod(2\pi) \leq (max_j-min_j) \qquad (1)$$

$feas_j(\theta)$ indicates that a delay of $\theta$ radians is feasible as defined by equation 1 for delay line $_j$.

A collection of delay lines can achieve any delay if for every $\theta$ from 0 to $2\pi$ a delay of $\theta$ is feasible for at least one of the delay lines. To see this, assume that input i is to be delayed by $\theta_i$ radians. Choose j such that $feas_j(\theta_i)$. Then, delaying input event $i+(\theta_i-min_j)div(2\pi)$ by $min_j+((\theta_i-min_j) mod(2\pi))$ radians produces an output event at the desired time. Thus, for each requested delay, the controller 24 selects a delay line, a delay amount, and an input event that will produce this delay.

In one implementation of the present invention, $max_0$ is feasible for delay line 1, $max_1$ is feasible for delay line 2, and so on, with $max_{k-1}$ feasible for delay line 0.

Figure 5:
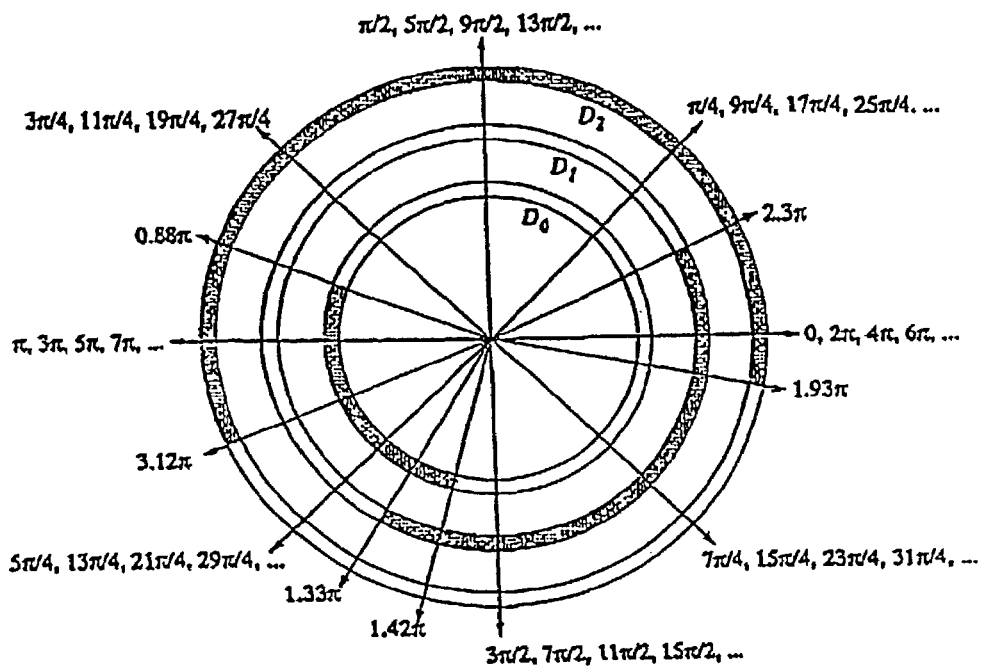
FIG. 5 is a simplified diagram showing possible phase shifts of three delay lines.

FIG. 5 shows an example of this implementation with three delay lines. The range of delays of each delay line is indicated by the delay line's shaded region. The axes of FIG. 5 are labeled to depict the cyclic nature of phase: delays of $\theta, \theta+2\pi, \theta+4\pi, \ldots$ are congruent.

For simplicity, assume that for each j with $0 \leq j < k-1$, the delay that delay line j+1 can be set to that is congruent with $max_j$ is exactly equal to $max_j$ (i.e. no offsets by multiples of $2\pi$). This implies that the delay that delay line 0 can be set to match $max_{k-1}$ is $2\pi$ radians less than $max_{k-1}$. The delay line shown in FIG. 5 satisfies these assumptions. For example, $max_0=1.42\pi$ radians, and delay line 1 can be set to this delay:

$$min_1=1.33\pi \leq max_0=1.42\pi \leq max_1=2.3\pi$$

Likewise, $$min_2=1.93\pi \leq max_1=2.3\pi \leq max_2=3.12\pi$$

and, $$min_0=0.88\pi \leq max_2-2\pi=1.12\pi \leq max_0=1.42\pi$$

Now, assume that a delay of $4.757\pi$ has been requested. Delaying input event i by 4.75 $7\pi$ radians generates an output event at the same time as delaying input event i+1 by $2.75\pi$ radians. The latter event can be produced from delay line $D_2$. If the delays for successive events increase from this value, the delay of line $D_2$ can be increased accordingly until a delay greater than $5.12\pi$ radians is requested, at which point $D_2$ achieves its maximum delay of $3.12\pi$ radians. At this point, delay line $D_0$ can be used: delaying input event i by $5.12\pi$ radians is equivalent to delaying input event i+2 by $1.12\pi$ radians, which can be done by pipeline $D_0$. Further increases in the requested delay lead to a switch to delay line $D_1$ when the requested delay is between $5.337\pi$ and $5.427\pi$ radians, and back to $D_2$ when the delay is between $5.93\pi$ and $6.3\pi$ radians.

Conversely, starting from the delay of $4.757\pi$ radians as described above, the delay can be decreased by decreasing the delay of delay line $D_2$. When the requested delay is between $3.937\pi$ and $4.3\pi$ radians, then the output can be switched to generation from delay line $D_1$. Further decrease leads to a switch to delay line $D_0$ and eventually to a switch back to delay line $D_2$.

FIG. 6 shows the operation of the three delay line implementation of this invention from FIG. 5 where: Input event i occurs at time $2\pi*i$.

For the example with increasing delays, the control requests that input event 0 be output $4.75\pi$ time units later, and that the input-to-output delay increase by $0.18\pi$ time units for each successive event.

For the example with decreasing delays, the control requests that input event 0 be output $4.757\pi$ time units later, and that the input-to-output delay decrease by $0.18\pi$ time units for each successive event.

First, consider operation with increasing delays. Input event 0 occurs at time 0, and the corresponding output is to occur at time $4.757\pi$. Noting that input event 1 occurs at time $2\pi$, output event 0 is generated by delaying input event 1 by $2.75\pi$ time units using delay line $D_2$. In FIG. 6, the "logical input event time" gives the time of the event with respect to which the delay was requested. The "use input event" gives the input event that is input to a delay line to produce an output event at the requested time. For example, input event 1 is used to generate an output event that occurs $2.75\pi$ time units after input event 1 which corresponds to the request to delay input event 0 by $4.757\pi$ time units.

Input event 1 is to be delayed by $(4.75+0.18)\pi=4.93\pi$ time units. Thus, output event 1 should occur at time $6.93\pi$. This is done by delaying input event 2 which occurs at time $4\pi$ by $2.937\pi$ time units using delay line $D_2$ again. Alternatively, this output event could have been generated by delaying input event 3 which occurs at time $6\pi$ by $0.93\pi$ time units using delay line $D_0$.

Next, input event 2 is to be delayed by $(4.75+2*0.18)\pi=5.11\pi$ time units. Thus, output event 2 should occur at time $9.11\pi$. This is done by delaying input event 4 which occurs at time $8\pi$ by $1.11\pi$ time units using delay line $D_0$.

Note that in FIG. 6 for increasing delays, input event 3 is not used to produce an output event. Likewise, output event 12 is generated from input event 14, and output event 13 is generated from input event 16, and no output event generated from input event 15.

The lower part of FIG. 6 shows the operation of the delay lines as the requested delay is successively decreased. Again, input event 0 is to be delayed by $4.75\pi$ time units and this is achieved by delaying input event 1 by $2.75\pi$ time units using delay line $D_2$. Subsequent events are delayed by progressively shorter amounts first by decreasing the delay of delay line $D_2$, then by switching to using delay line $D_1$, and later by switching to delay line $D_1$.

For output event 9, a delay of $3.13\pi$ time units is requested, and output event 10 has a requested delay of $2.95\pi$ time units. To achieve this, input event 10 is input to both delay lines $D_0$ and $D_2$. It is output from delay line $D_0$ after a delay of $1.13\pi$ time units and from delay line $D_2$ after a delay of $2.95\pi$ time units. This satisfies both requests. The foregoing illustrates how with requests for decreasing input-to-output delay, the same input event may be used to generate two output events.

A particular embodiment of the present invention uses two delay lines, each of which has the same range of delay with the difference between the maximum and the minimum delay limit being at least one clock period. Under this configuration, when one of the delay lines is close to the maximum delay limit, the other delay line is set to one clock period less than the maximum delay limit. Transfers of the various signals are the same as described above. Similarly, when one delay line is close to the minimum delay limit, the other delay line is set to one clock period greater than the minimum delay limit.

Figure 7:
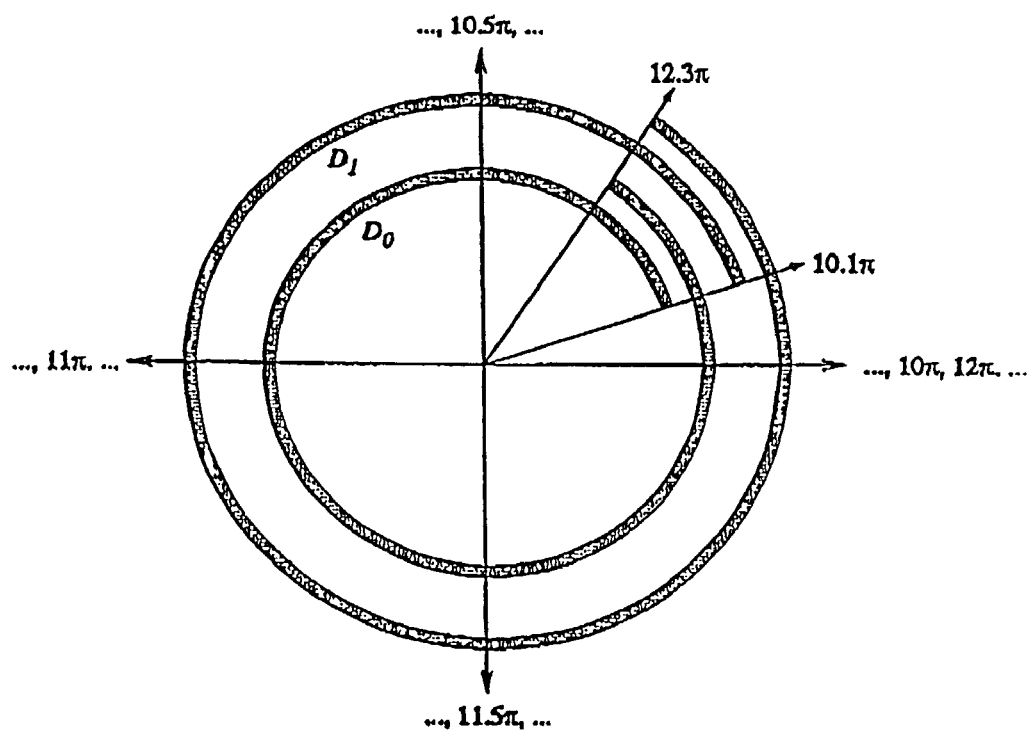
FIG. 7 is a simplified diagram illustrating a design with two identical delay lines.

More specifically, FIG. 7 illustrates the design with two delay lines. In this case, delay lines $D_0$ and $D_1$ both have a minimum delay of $10.1\pi$ radians and a maximum delay of $12.3\pi$ radians. If delay line $D_0$ is currently generating output events and has a delay between $12.1\pi$ and $12.3\pi$ radians, then delay line $D_1$ can be set to a delay $2\pi$ radians less than the delay of line $D_0$. Then, if a requested delay would require line $D_0$ to have a delay greater than $12.3\pi$ radians, an input event can be dropped, and the next input sent through delay line $D_1$ with a delay $2\pi$ radians less than would be required for $D_0$. A similar hand-off is performed when one of the delay lines reaches its lower delay limit.

This approach has the advantage that both delay lines have identical range (and therefore can be identical designs). Furthermore, for some delay line implementations, making small changes in the delay between successive events is possible, but making large changes is not. If the requested changes in delay are small, then this implementation avoids requiring any delay line to make a large change in its delay between successive input events.

An analysis of the spectral properties of the present invention is now provided. Let T be the clock period. Assume that the delay can be increased at a rate of T/M time units per clock cycle, or decreased by T/M time units per clock cycle, or left unchanged. Further assume that M is large, so $1/(1+(1/M))\approx 1-(1/M)$. It should be understood that the foregoing assumptions are provided merely for the sake of illustrating an intuitive estimate of the width of the frequency variation. By making the foregoing assumptions, this scheme is thus equivalent to decreasing the clock frequency by 1/M of its nominal value, increasing the clock frequency by 1/M of its nominal value, or leaving the clock frequency unchanged. For large values of M, the maximum clock frequency with this approach is very close to the nominal clock frequency. As discussed below, a design with M=100 will be considered, which means that the clock period remains within 1% of its nominal value. It should be further understood that while the analysis described herein applies to a tunable delay line which is implemented with two delay lines, it should be apparent to one of ordinary skill in the art that the same analysis can be applied to any implementation with a delay line which allows continuous and unbounded variation of the delay.

For any even integer M, the present control scheme works in epochs of P=T*M/2 time units. In each epoch, a phase shift amount in the interval $[-\pi,\pi)$ radians is chosen, uniformly at random. The choices for different epochs are independent random variables. Let 67 denote a chosen phase shift. If δ<0, then the delay of the adjustable delay line 26 or 28 is increased by T/M time units during each of the first—$(M*\delta)/(2*\pi)$ cycles of the epoch, and the delay is held constant for the remainder of the epoch. If δ>0, then the delay of the adjustable delay line 26 or 28 is decreased by T/M time units during each of the first $(M*\delta)/(2*\pi)$ cycles of the epoch, and the delay is held constant for the remainder of the epoch. If δ=0, the delay is held constant throughout the epoch. In all three cases, the clock at the end of the epoch is shifted by δ radians relative to the clock at the beginning of the epoch. To simplify the analysis, the choice of δ is not restricted to values where $(M*\delta)/(2*\pi)$ is an integer, although such a restriction may be useful when implementing this technique. When the delay is increased, it may be the case that the delay of delay line 26 is increased during the first part of the epoch. When the delay of delay line 26 reaches its upper limit, operation is transferred to delay line 28, and then the delay of line 28 is increased until the target delay is reached. An equivalent situation can occur with decreasing delays.

Let f(t) be the time-domain signal produced by this method. An explicit formula for f(t) is needed, and the following definitions are used in this formula. Let P=T*M/2 be the duration of an epoch. Let $\delta_i$ be the phase shift of the $i^{th}$ epoch. For $t \geq 0$, let $$D(t) = \lfloor t/P \rfloor \quad (2)$$
$$r(t) = t - P*D(t)$$
$$\theta(t) = r(t)*(\pi/P)*\text{sign}(\delta_{D(t)}), \quad \text{if } r(t) < |\delta_{D(t)}|*P/\pi$$
$$\text{sign}(x) = 1 \text{ if } x \geq 0$$
$$= -1 \text{ if } x < 0$$
$$= \delta_{D(t)}, \quad \text{if } r(t) \geq |\delta_{D(t)}|*P/\pi$$

-continued $$\Delta_j = \sum_{i=0}^{j-1} \delta_i,$$

$$\Theta(t) = ((\pi + \Delta_{D(t)}) \bmod (2*\pi)) - \pi$$

In practical terms, D(t) tells what epoch contains t; r(t) tells how far t is into the current epoch;. θ(t) is the current phase shift in the current epoch; $\Delta_j$ is the total phase shift in the epochs preceding the $j^{th}$ epoch; and Θ(t) is the total phase shift in epochs preceding the current epoch shifted by an integer multiple of $2\pi$ to obtain a value in $[-\pi, \pi)$. An explicit formula for f(t) can be written as follows:

$$f(t) = e^{i*(\Theta(t)+\theta(t)+\omega_0*t)} \quad (3)$$

where $\omega_0/(2*\pi)$ is the input clock frequency. Note that for any $j \neq j_{-1}$, $\Theta_j$ and $\Theta_j$ are independent random variables, uniformly distributed in $[-\pi,\pi)$ Now consider the spectrum of f(t) signal observed in an interval of S time units:

$$F(\omega) = \int_{t=0}^{S} e^{-i*\omega*t} f(t) dt \quad (4)$$

Now, assume that S=k*P for some integer k. Equation 3 is rewritten as:

$$F(\omega) = \sum_{j=0}^{k-1} \left( \int_{t=0}^{P} e^{-i*\omega*(t+j*P)} f(t+j*P) dt \right) \quad (5)$$

expanding f(t) according to equation 3 yields:

$$F(\omega) = \sum_{j=0}^{k-1} e^{-i*\omega*j*P} \left( \int_{t=0}^{P} e^{-i*\omega*t} f(j*P+t) dt \right) \quad (6)$$

$$= \sum_{j=0}^{k-1} e^{-i*\omega*j*P} \left( \int_{t=0}^{P} e^{-i*\omega*t} e^{i*(\Theta(j*P+t)+\theta(j*P+t)+\omega_0*(j*P+t))} dt \right)$$

$$= \sum_{j=0}^{k-1} e^{-i*((\omega-\omega_0)*j*P-\Delta_j)} \left( \int_{t=0}^{P} e^{-i*((\omega-\omega_0)*t-\theta(j*P+t))} dt \right)$$

Because the δj are independent and uniformly distributed in $[-\pi,\pi)$, so are the Δj and the $$(((\omega-\omega_0)*j*P-\Delta_j+\pi) \bmod (2*\pi)) - \pi \quad (7)$$

Thus, $$e^{-i*((\omega-\omega_0)*j*P-\Delta_j)} \quad (8)$$

is a random variable with a mean of zero and a variance of one and is independent for different values of j. The values of $$\int_{t=0}^{P} e^{-i*((\omega-\omega_0)*t-\theta(j*P+t))} dt \qquad (9)$$

are bounded in absolute value by P.

Although $\Delta j$ and $\Delta_{j+1}$ are independent random variables, they are related by the value of the term in equation 8.

However, for j even, the values of $$e^{-i*((\omega-\omega_0)*j*P-\Delta_j)} \left( \int_{t=0}^{P} e^{-i*((\omega-\omega_0)*t-\theta(j*P+t))} dt \right) \qquad (10)$$

are independent random variables that have mean zero and a variance of at most $P^2$, and likewise for j odd. For large values of k, the central limit theorem yields that the distribution of $$\sum_{j \in [0 \ldots k], j \text{ even}} \int_{t=0}^{P} e^{-i*((\omega-\omega_0)*j*P-\Delta_j)} (e^{-i*((\omega-\omega_0)*t-\theta(j*P+t))}) dt \qquad (11)$$

is dominated in magnitude by a random variable with a Gaussian distribution with mean zero and variance $k*P^2/2$, and likewise for j odd. From this it is concluded that $$P\{\|F(\omega)\|>u\} \leq P\{N(0, 2*k*P^2) > \alpha*u\} \qquad (12)$$

where $N(\mu, \sigma^2)$ is a Gaussian distributed random variable with mean $\mu$ and variance $\sigma^2$. In the limit as k goes to infinity, $\alpha$ goes to one.

The key consequence of equation 12 is that with high probability, $F(\omega)$ is less than a small multiple of $P*\sqrt{k}$ for all $\omega$. If there is concern about energy in a frequency band of width $\Delta f$, the number of such bands grows with $\sqrt{k}$ as well, and the peak energy in any such band grows as some fractional power of k. Empirically, it is found that the reduction of peak EMI is approximated well by:

$$\text{peak reduction} \approx (8*log_{10}(k) - 2.5) dB \qquad (13)$$

When the parameters of the analysis are examined, it can be seen that there are several advantages to this approach. First, as clock speeds increase, the value of k increases as well. Thus, the method presented provides greater peak suppression as clock frequency increases. Second, if a spectrum analyzer is used with a window greater than 8 μs, then the effective value of k increases as well. For example, in compliance with FCC regulations for EMI reductions, 8 μs is the minimum feasible window size for 125 KHz spectrum resolution. Finally, the analysis is based on uniformly distributed phase shifts for the epochs. When practicing the present invention, the values of these shifts could be chosen during the design process to obtain better peak suppression than the "highly probable" case considered here.

The above scheme provides a number of advantages over prior art methods. Consider a control scheme where the maximum and the minimum delay limits of the adjustable delay lines are $\delta_{max}$ and $\delta_{min}$ respectively. If $\delta_{max} - \delta_{min}$ is less than or equal to half of the clock signal period, then there is a strong spectral component at the nominal clock frequency; otherwise, the spectral component is canceled at the nominal clock frequency.

To see this, consider a version of the clock signal that is delayed by $(\delta_{max} - \delta_{min})/2$, call this signal $\Phi'$. For any delay $\delta$ in $[\delta_{min}, \delta_{max}]$, a clock signal delayed by $\delta$ has a non-negative correlation with $\Phi'$. As the clock signal makes transitions in phase (assuming that an instantaneous 180 degree phase shift is not tolerable), then it has a positive correlation with $\Phi'$. Thus, the clock signal has a long-term, positive correlation with $\Phi'$.

For example, the scheme presented in the article entitled Clock Dithering for Electromagnetic Compliance Using Spread Spectrum Phase Modulation, Proceedings of the 1999 IEEE International Solid-State Circuits Conference, pp. 186-187, 459, February, 1999, uses phase shifts within a 180 degree window. To obtain the 13 dB peak suppression reported therein, the intervals where the clock runs at the nominal rate must be roughly ten times as long as the time spent making a 180 degree shift. This suggests that the sampling window of the spectrum analyzer used therein is much larger than the 8 microsecond window considered here. As noted above, the scheme presented herein achieves an even greater peak suppression when larger sampling windows are used.

Very small changes are sufficient to achieve significant EMI reductions. Consider a CPU with a 1 GHz clock. Let M=100. This means that the output events from a periodic delay line are separated by a nominal value of 1 ns (1000 MHz), a minimum value of 0.99 ns (roughly 1010 MHz), and a maximum value of 1.01 ns (roughly 990 MHz). Each epoch of the phase control has a duration of 50 ns. The minimum sampling window with 125 KHz resolution is 8 μs. Thus, based on the foregoing values, k=160. By equation 11, the peak EMI is reduced by roughly 15 dB.

Under the present invention, it is important to achieve a uniform distribution of delay values and maintain the desired duty cycle for the clock signal (e.g. equal high and low times). The above analysis assumed that the $\delta_j$ values were uniformly distributed in $[-\pi, \pi)$. Imbalances and non-linearities in a delay line implementation may result in an actual distribution that deviates slightly from the ideal case. This could result in some residual energy at the nominal clock frequency. There could also be some residual from imperfect estimates of the 360 degree point for the periodic delay line shown in FIG. 4.

Simulation Results

To demonstrate the present invention and validate the above analysis, a small number of simulations were performed using MatLab. A MatLab script for a typical run is included in Appendix A. The simulations considered three phase modulation strategies:

1. Random phase changes within fixed length epochs as described above.
2. Random phase changes with variable length epochs. In each epoch, a phase shift between $-\theta$ degrees and $+\theta$ degrees is chosen. The value of $\theta$ is a parameter to the simulation. As soon as the phase shift is achieved, a new epoch is started.
3. Phase changes of either +180 degrees or -180 degrees is chosen followed by an interval of operation at the nominal clock frequency. The length of the latter interval is chosen uniformly in the interval [0, D]. The value of D is a parameter of the simulation.

All of the simulations were run with frequency deviations of ±1% from the nominal frequency. A small number of runs suggested that the optimal value for $\theta$ for the second approach is 180 degrees. Likewise, the optimal value for D in the third approach appears to be near 50 cycles (i.e. the time for a 180 degree phase shift with M=100).

The above three phase modulation strategies were compared for a symmetric, square wave clock with nominal 1 GHz frequency, and high and low values of +1 and −1 respectively. The FFT was computed for 131,072 samples using a 16 GHz sampling rate. This yields a 125 KHz frequency resolution which corresponds to the FCC requirements. For each phase modulation strategy, 20 runs were computed and the one run with the smallest peak amplitude was selected. It was observed that a peak attenuation of 15.85 dB for the first phase modulation strategy, the one described in the above analysis. The second phase modulation strategy achieved a peak attenuation of 17.34 dB, and the third phase modulation strategy achieved an attenuation of 7.30 dB. It should be noted that these figures are based on the best of 20 random runs. By taking more runs and/or systematically refining the delay choices, some improvement would probably be observed. On the other hand, the actual implementation will probably introduce some residual error.

Figure 8:
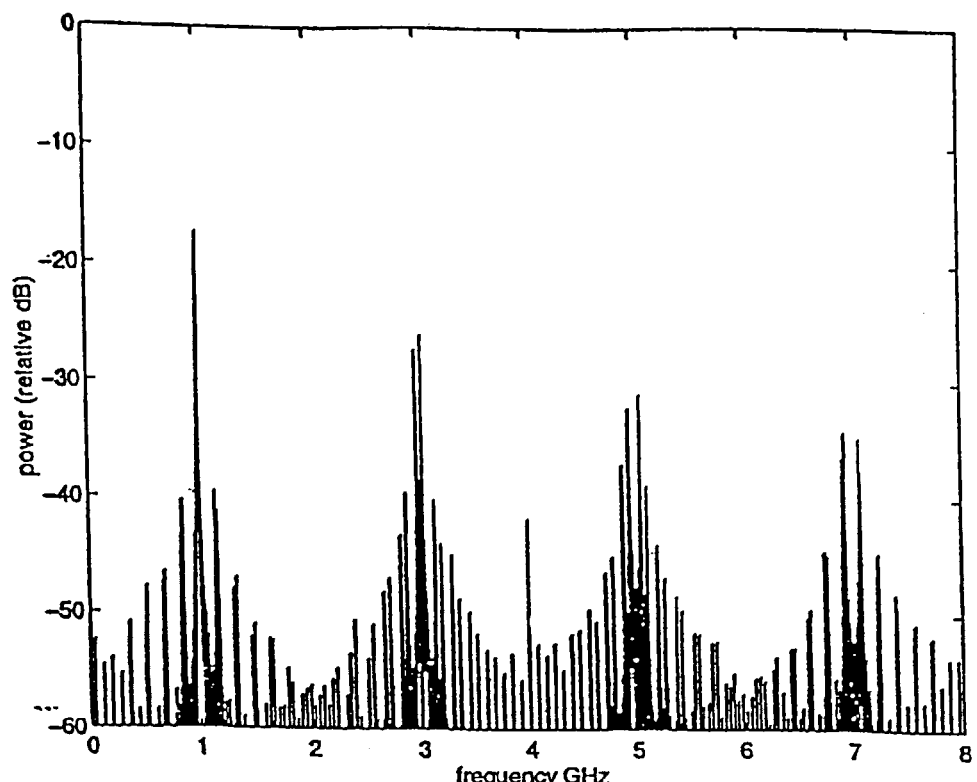
FIG. 8 is a diagram showing the energy spectrum of a clock signal generated pursuant to a phase modulation technique in accordance with the present invention.

FIG. 8 shows the energy spectrum observed when using the second phase modulation strategy. The main peaks are centered at the fundamental frequency of the clock signal. The secondary peaks correspond to the third, fifth, and seventh harmonics, a consequence of using a square wave clock. The energy spectrum is plotted in decibels relative to the peak of the unmodulated clock signal.

Figure 9:
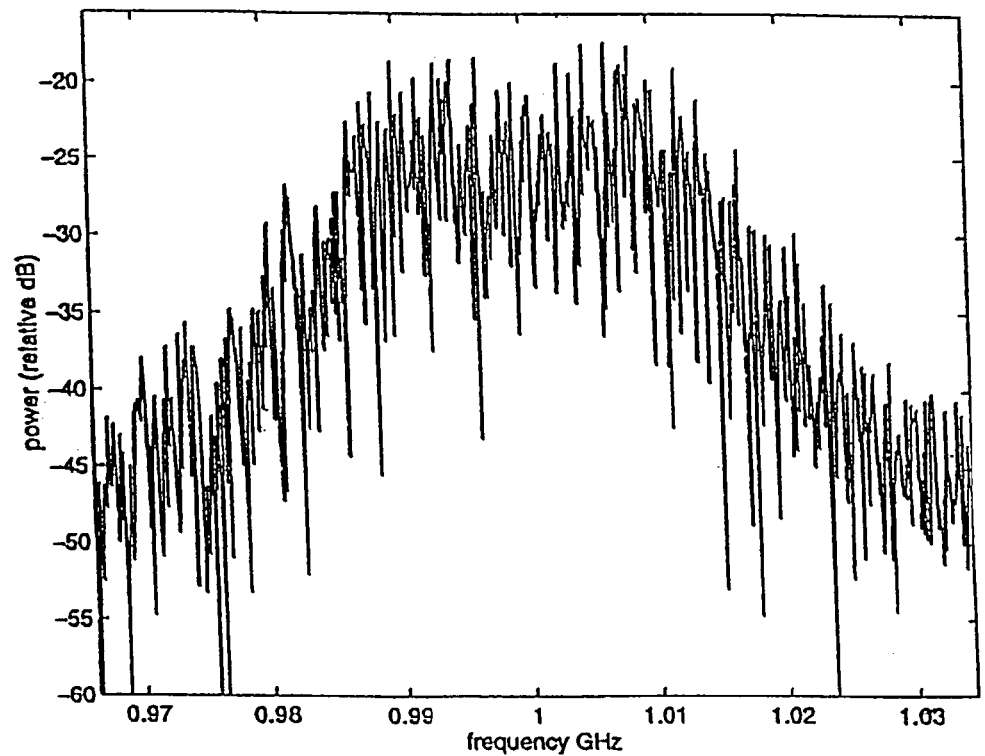
FIG. 9 is a more detailed diagram of FIG. 4 showing the energy spectrum of a clock signal around the 1 GHz peak.

FIG. 9 shows the energy spectrum in a ±30 MHz band around the 1 GHz peak of the clock signal using the second phase modulation strategy. This shows that the clock energy has been widely spread, and there is no single, large peak.

All three of the phase modulation strategies mentioned above achieve better EMI reduction than existing frequency modulation techniques. In theory, anything that can be achieved with phase modulation can also be effected with frequency modulation, since the modulation signal for frequency modulation is the time derivative of the modulation signal for phase modulation. However, as mentioned above, the present invention uses tunable delay lines to implement a modulation signal for phase modulation that contains much higher frequency components than the modulation signals used for existing frequency modulation techniques. This presence of higher frequency modulation components allows the present invention to provide advantages over the existing frequency modulation techniques.

While the foregoing analysis is conducted using a clock signal, it is to be understood that the present invention can be similarly applied to other signals that exhibit a periodic timing nature. For example, power and data signals often bear a correlation with a clock signal. Therefore, spreading the spectrum of the clock signal also causes spreading of the spectrum of these other signals. Furthermore, a person of ordinary skill in the art will know of ways to apply the present invention to other types of signals.

It is understood that the examples and embodiments described herein are for illustrative purposes only and that various modifications or changes in light thereof will be suggested to persons skilled in the art and are to be included within the spirit and purview of this application and scope of the appended claims.

APPENDIX A

Matlab Script

This Appendix shows some of the MatLab functions used to generate the results presented. The function "scheme1" generates a clock signal using the technique presented in the above analysis. The implementations of other analogous schemes are similar. The script "do_it" runs the chosen technique for twenty trials, reports the improvement of the best trial, and plots the energy spectrum for the best trial. The function "gain(clk0, clk1)" computes the value of the peak of the spectrum of clk1 relative to the peak of the energy spectrum of clk0 in decibels.

A.1 scheme1 function clk = scheme1(sample_rate, n, epoch)

% sample_rate = samples per nominal clock cycle

% n = (number of samples)/sample_rate

% epoch = number of clock cycles in an epoch, used for the

% randomized signals, ignored here.

pts = n*sample_rate;

% generate the clock signal vector clk = zeros(pts, 1);    % the clock rate s = 0;                  % of last sample e = epoch;              % time in epoch ee = 0;                 % time to switch back to nominal clock period t = 0;                  % time of next clock event v =1;                   % current clock value p = sample_rate/2.0;    % current clock half-period dp = 1.0/(2.0*epoch);   % fractional change in period for randomization m = 0;

while (m < n*sample_rate);   % generate samples if (e > epoch*sample_rate)   % start a new epoch e = 0;

ee = epoch*rand(1)*sample_rate;

if(rand(1) < 0.5) p = (1 - dp)*sample_rate/2.0;

else p = (1 + dp)*sample_rate/2 .0;

end end m = m+1;

e = e+1;

if(e > ee) p = sample_rate/2.0;

end while(m > t); % update clock value v = -v;

t = t+p;

```
    end
    clk(m) = v;
end
```

A.2  do_it

% to get the reported results

% set sample_rate=16; n = 8192; epoch = 50;

sample_rate = 16;

n = 8192;

epoch = 50;

% seed the random number generator to get repeatable results rand('seed'), log(pi*pi));

clk0 = unmodulated(sample_rate, n, epoch);

g = -1;

for i = 1:20 clk = scheme3(sample_rate, n, epoch);

g2 = gain(clk0, clk);

if(g2 > g)

clk1 = clk;

g = g2;

end g   % report best improvement so far end f0 = abs(fft(clk0));

f1 = abs(fft(clk1));

m0 = max(f0);

z0 = 0.001;

db = 20.0/log(10);

x = zeros(size(f1)/2, 2);

y = zeros(size(f1)/2, 2);

for i = 1:size(f1)/2;

x(i) = i / n;

y(i) = db*log(max(f1(i)/m0, 0.001));

end plot(x, y);

xlabel 'frequency GHz' ylabel 'power (relative dB)'

A.3 gain function d = gain(clk0, clk1)

db = 20.0/log(10);

$$d = db * \log(\max(abs(fft(clk0)))/\max(abs(fft(clk1))));$$

What is claimed is:

1. A circuit for reducing electromagnetic interference generated by a clock signal inside an electronic device, comprising:
   a signal generator for generating the clock signal;
   a delay generator for generating a delayed version of the clock signal using phase modulation, the delay generator comprising:
   a first delay line and a second delay line each receiving the clock signal, wherein the first delay line and the second delay line each produce a range of delays with a minimum value and maximum value, the total range of the first and second delay lines equal to at least one period of the clock signal;
   a delay multiplexer including a first input coupled with the first delay line and a second input coupled with the second delay line; and
   a delay controller coupled with the delay multiplexer and configured to select either one of the first and second delay lines to drive the output of the delay multiplexer in accordance with a control signal, the output comprising the delayed version of the clock signal;
   wherein the control signal controls the delay controller to produce an overall delay of the clock signal varying with time in such a manner as to cause spreading of the spectrum of the delayed version of the clock signal; and
   logic circuitry located within the electronic device and configured to receive the delayed clock signal.

2. The circuit according to claim 1, wherein the delay generator is capable of accepting a control signal as input.

3. The circuit according to claim 2, wherein the clock signal and the delayed clock signal differ by an amount of delay; and
   wherein the amount of delay is adjustable according to the value specified by the control signal.

4. The circuit according to claim 3, wherein the delay controller receives the control signal and controls the delay multiplexer in accordance with the control signal.

5. The circuit according to claim 4, wherein the first delay line and the second delay line comprise a delay circuit.

6. The circuit according to claim 5, wherein the delay multiplexer further comprises a plurality of additional inputs;
   wherein the delay circuit further comprises a plurality of additional delay lines;
   wherein each of the additional delay lines is respectively coupled to one input of the delay multiplexer;
   wherein the delay controller is capable of separately controlling each of the delay lines; and
   wherein the delay controller controls the delay multiplexer to select one of the delay lines to drive the output of the delay multiplexer.

7. The circuit according to claim 1, wherein the circuit is integrated with a CPU on an integrated circuit.

8. The circuit according to claim 1, wherein the minimum value is zero.

9. A clock-signal-delaying circuit, comprising:
   a first adjustable delay line having a clock signal as its input;
   a second adjustable delay line having the clock signal as its input;
   a delay multiplexer having two inputs and an output, wherein the first and second adjustable delay lines are respectively coupled to the two inputs; and
   a delay controller for controlling the first and second adjustable delay lines and the delay multiplexer in accordance with a control signal;
   wherein the control signal represents an overall delay of the clock signal;
   wherein the delay multiplexer selects either the first adjustable delay line or the second adjustable delay line in accordance with a command generated by the delay controller to drive its output to produce a delayed version of the clock signal;
   wherein the first delay line and the second delay line produce a range of delays with a minimum value and maximum value, the range equal to at least one period of the clock signal; and
   wherein the overall delay varies with time in such a manner as to cause spreading of the spectrum of the delayed version of the clock signal.

10. The circuit according to claim 9, wherein nature of the overall delay is predetermined.

11. The circuit according to claim 9, wherein nature of the overall delay is random.

12. The circuit according to claim 9, wherein the clock signal is transmitted along the first adjustable delay line in accordance with a first predetermined delay; and
    wherein the clock signal is transmitted along the second adjustable delay line in accordance with a second predetermined delay.

13. The circuit according to claim 12, wherein when the overall delay is to be increased to close to the maximum value, whichever of the first and second adjustable delay lines not currently selected to drive the output of the delay multiplexer is then set to a new predetermined delay which equals to one clock period less than the maximum value; and
    wherein when the overall delay is to be increased to exceed the maximum value, whichever of the first and second adjustable delay lines not currently selected to drive the output of the delay multiplexer is then selected to drive the output of the delay multiplexer.

14. The circuit according to claim 12, wherein when the overall delay is to be decreased to close to the minimum value, whichever of the first and second adjustable delay lines not currently selected to drive the output of the delay multiplexer is then set to a new predetermined delay which equals to one clock period more than the minimum value; and
    wherein when the overall delay is to be decreased to less than the minimum value, whichever of the first and second adjustable delay lines not currently selected to drive to the output of the delay multiplexer is then selected to drive the output of the delay multiplexer.

15. An improved clock-signal-generating circuit, comprising:
    a reference oscillator for generating a first clock signal;
    a frequency multiplier for increasing the frequency of the first clock signal thereby producing a second clock signal; and
    a clock buffer for amplifying the second clock signal;
    wherein the circuit is improved by including a delay element coupled between the frequency multiplier and the clock buffer;

wherein the delay element comprises a tunable first delay line and a tunable second delay line that each phase-modulates the second clock signal produced by the frequency multiplier in accordance with a predetermined delay, wherein the delay element is configured to produce a range of delays with a minimum value and maximum value, the range equal to at least one period of the second clock signal; and wherein the delay element is controlled by a control signal indicative of the predetermined delay, the predetermined delay varying with time in such a manner as to cause spreading of the spectrum of the phase-modulated second clock signal.

16. A method for reducing electromagnetic interference generated by a clock signal inside an electronic device, comprising the steps of:

generating the clock signal;

inputting the clock signal to each of two separate delay lines;

phase-modulating the clock signal in each of the two separate delay lines in accordance with a control signal identifying a control delay;

selecting either one of the two separate delay lines to drive an output of a delay multiplexer based on the control delay; and routing the selected phase-modulated clock signal to logic circuitry located within the electronic device;

wherein the control delay varies with time in such a manner as to cause a spreading of the energy of the selected phase-modulated clock signal over a range of frequencies in a short time interval; and wherein the two separate delay lines are configured to each produce a range of delays with a minimum value and maximum value, the total range of the first and second delay lines equal to at least one period of the clock signal.

17. The method according to claim 16, wherein the selecting step includes:

when the control delay is close to an upper delay limit, setting whichever one of the two separate delay lines not currently selected to drive the output of the delay multiplexer to a new delay which is one clock period less than the upper delay limit; and when the control delay exceeds the upper delay limit, selecting whichever one of the two separate delay lines not currently selected to drive the output of the delay multiplexer to drive the output of the delay multiplexer.

18. The method according to claim 16, wherein the selecting step includes:

when the control delay is close to a lower delay limit, setting whichever one of the two separate delay lines not currently selected to drive the output of the delay multiplexer to a new delay which is one clock period more than the lower delay limit; and when the control delay becomes less than the lower delay limit, selecting whichever one of the two separate delay lines not currently selected to drive the output of the delay multiplexer to drive the output of the delay multiplexer.

19. The method according to claim 16, wherein the step of phase-modulating the clock signal further comprises the steps of:

inputting the clock signal to each of a plurality of additional delay lines; and selecting one of said plurality of additional delay lines to drive an output of the delay multiplexer based on the control delay.

20. The method according to claim 19, wherein the selecting step includes:

when the control delay is close to an upper delay limit, setting a delay line not currently selected to drive the output of the delay multiplexer to a new delay which differs from the upper delay limit by an integer number of clock periods; and when the control delay exceeds the upper delay limit, selecting a delay line not currently selected to drive the output of the delay multiplexer to drive the output of the delay multiplexer.

21. The method according to claim 19, wherein the selecting step includes:

when the control delay is close to a lower delay limit, setting a delay line not currently selected to drive the output of the delay multiplexer to a new delay which differs from the lower delay limit by an integer number of clock periods; and when the control delay becomes less than the lower delay limit, selecting a delay line not currently selected to drive the output of the delay multiplexer to drive the output of the delay multiplexer.

22. An improved method for reducing electromagnetic interference generated by a clock signal, comprising the steps of:

generating a first clock signal;

multiplying the frequency of the first clock signal to produce a second clock signal; and amplifying the second clock signal before distributing the second clock signal to logic circuitry;

wherein said improvement comprises the step of:

phase-modulating the second clock signal in accordance with a control signal and before the amplifying step;

wherein the step of phase-modulating the second clock signal results in an overall delay varying with time in such a manner as to cause spreading of the energy of the second clock signal over a range of frequencies;

wherein the step of phase-modulating the second clock signal is performed by a selected one of two separate delay lines, the separate delay lines each configured to produce a range of delays with a minimum value and maximum value, the total range of the two separate delay lines equal to at least one period of the first clock signal; and wherein the spreading of the energy of the second clock signal over the range of frequencies is achieved over a short time interval.

23. A clock-signal-delaying circuit, comprising:

a plurality of adjustable delay lines each having a clock signal as its respective input;

a delay multiplexer having a plurality of inputs and an output, wherein the plurality of adjustable delay lines are respectively coupled to the plurality of inputs; and a delay controller for controlling the plurality of adjustable delay lines and the delay multiplexer in accordance with a control signal;

wherein the control signal represents an overall delay of the clock signal;

wherein the delay multiplexer selects one of the plurality of adjustable delay lines in accordance with a command generated by the delay controller to drive its output to produce a delayed version of the clock signal;

wherein the plurality of delay lines are configured to produce a range of delays with a minimum value and maximum value, the range equal to at least one period of the clock signal; and wherein the overall delay varies with time in such a manner as to cause spreading of the spectrum of the delayed version of the clock signal.

24. The circuit according to claim 23, wherein nature of the overall delay is predetermined.

25. The circuit according to claim 23, wherein nature of the overall delay is random.

26. The circuit according to claim 23, wherein each of said plurality of adjustable delay lines transmits the clock signal in accordance with a predetermined delay, each of said predetermined delays is adjustable.

27. The circuit according to claim 26, wherein when the overall delay is to be increased to close to the maximum value, another adjustable delay line not currently selected to drive the output of the delay multiplexer is then set to a new predetermined delay which differs from the maximum value by an integer number of clock periods; and wherein when the overall delay is to be increased to exceed the maximum value, one of the other adjustable delay lines not currently selected to drive the output of the delay multiplexer is then selected to drive the output of the delay multiplexer.

28. The circuit according to claim 26, wherein when the overall delay is to be decreased to close to the minimum value, another adjustable delay line not currently selected to drive the output of the delay multiplexer is then set to a new predetermined delay which differs from the minimum value by an integer number of clock periods; and wherein when the overall delay is to be decreased to less than the minimum value, one of the other adjustable delay lines not currently selected to drive to the output of the delay multiplexer is then selected to drive the output of the delay multiplexer.

* * * * *